(12) United States Patent
Fuchs

(10) Patent No.: US 10,515,082 B2
(45) Date of Patent: Dec. 24, 2019

(54) IDENTIFYING FREQUENT ITEM SETS

(71) Applicant: salesforce.com, inc., San Francisco, CA (US)

(72) Inventor: Matthew Fuchs, Los Gatos, CA (US)

(73) Assignee: salesforce.com, inc., San Francisco, CA (US)

( * ) Notice: Subject to any disclaimer, the term of this patent is extended or adjusted under 35 U.S.C. 154(b) by 511 days.

(21) Appl. No.: 15/265,676

(22) Filed: Sep. 14, 2016

(65) Prior Publication Data

US 2018/0075036 A1 Mar. 15, 2018

(51) Int. Cl.
*G06F 16/00* (2019.01)
*G06F 16/2457* (2019.01)
*G06F 16/28* (2019.01)
*G06F 16/22* (2019.01)

(52) U.S. Cl.
CPC .... *G06F 16/24578* (2019.01); *G06F 16/2228* (2019.01); *G06F 16/285* (2019.01)

(58) Field of Classification Search
CPC .................................................. G06F 16/285
USPC .............................................. 707/727, 730
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz | |
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |

(Continued)

OTHER PUBLICATIONS

U.S. Appl. No. 13/986,251, Apr. 16, 2013.

*Primary Examiner* — Hanh B Thai
(74) *Attorney, Agent, or Firm* — Dergosits & Noah LLP; Todd A. Noah

(57) ABSTRACT

A system determines a count of each item in each item set, sorts each count into ascending order, assigns an ascending identifier to each item corresponding to each sorted count, and sorts each identifier in each item set in descending order. The system partitions item sets into a first group of item sets and a second group of item sets, each item set in the first group including a common largest identifier, determines a count for each subset of each item set of the first group, and determines a count of each subset of each item set by summing each count for each subset of each item set of the first group with each corresponding count for each corresponding subset of each item set of the second group. The system outputs a recommended item set based on the count of each subset of each item set.

20 Claims, 4 Drawing Sheets

(56) References Cited

U.S. PATENT DOCUMENTS

| | | |
|---|---|---|
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B1 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1* | 6/2006 | Kesler ................... G06F 16/252 |
| 7,194,477 B1* | 3/2007 | Bradley ................. G06Q 30/02 |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 7,962,524 B2* | 6/2011 | Okamoto ................. G06F 7/24 707/797 |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0033278 A1* | 2/2003 | Abe ........................... G06F 7/24 |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1* | 4/2003 | Mukundan .............. G06F 9/542 719/330 |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0004897 A1* | 1/2006 | Nadj ........................ G06F 7/22 |
| 2006/0074824 A1* | 4/2006 | Li ........................... G06F 19/24 706/20 |
| 2006/0218123 A1* | 9/2006 | Chowdhuri ........ G06F 16/24532 |
| 2006/0265413 A1* | 11/2006 | Blencowe ........... G06F 16/9038 |
| 2007/0005598 A1* | 1/2007 | Okamoto ................. G06F 7/24 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0287685 A1* | 11/2009 | Charnock ............... G06F 16/38 |
| 2009/0327342 A1* | 12/2009 | Xiao ....................... G06F 16/29 |
| 2011/0161943 A1* | 6/2011 | Bellows ................ G06F 9/4843 717/149 |
| 2012/0233137 A1 | 9/2012 | Jakobson et al. |
| 2012/0323936 A1* | 12/2012 | Paulsen ................... G06F 16/31 707/752 |
| 2013/0218948 A1 | 8/2013 | Jakobson |
| 2013/0218949 A1 | 8/2013 | Jakobson |
| 2013/0218966 A1 | 8/2013 | Jakobson |
| 2014/0075004 A1* | 3/2014 | Van Dusen ............. H04L 41/04 709/223 |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2016/0246870 A1* | 8/2016 | Anantharangachar ....................... G06F 16/35 |

* cited by examiner

| | | | | | | |
|---|---|---|---|---|---|---|
| | | 1 | | 1 | | |
| 2 | 1 | 2 | 1 | 2 | 2 | |
| 3 | 3 | 3 | 2 | 3 | 3 | 3 |
| Set 202 | Set 204 | Set 206 | Set 208 | Set 210 | Set 212 | Set 214 |

FIG. 2A

| | | | | | |
|---|---|---|---|---|---|
| 1 | 1 | | | | |
| 2 | 2 | 2 | 2 | 1 | |
| 3 | 3 | 3 | 3 | 3 | 3 |
| Set 206 | Set 212 | Set 202 | Set 210 | Set 204 | Set 214 |

| | | | | | |
|---|---|---|---|---|---|
| 0 | 1 | 2 | | | |
| 0 | 0 | 0 | 3 | 4 | 1 |
| 0 | 0 | 0 | 0 | 4 | 6 |
| Array 216 | Array 218 | Array 220 | Array 222 | Array 224 | Array 226 | Array 228 |

FIG. 2B

IDENTIFYING FREQUENT ITEM SETS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Given a large collection (millions or billions) of small sets of items (which may be called market baskets) sampled from an existing universe of items (such as products, services, or search terms), automated recommendation of items is often based on the identification of frequently occurring item sets, which are sets of items that were purchased together. There are other recommendation algorithms, such collaborative filtering, for circumstances when system users sample one item at a time. Frequent item sets is for circumstances when system users sample items together. Market basket analysis is a process in which retailers evaluate information in such market baskets to understand the purchase behavior of customers and/or the searching behavior of potential customers. This information can then be analyzed for purposes of cross-selling, the practice of selling an additional product or service to an existing customer. Examples of market basket analysis for cross selling are automated recommendations such as "customers who bought book A also bought book B," and "People who read 'History of Portugal' were also interested in 'Naval History.'" Many database systems use the Apriori algorithm to evaluate frequent item sets for market basket analysis. The Apriori algorithm first identifies the individual items that appear the most frequently in a database's item sets, and then extends these frequent individual items to larger and larger item sets, provided that the larger item sets appear sufficiently often in the database's sets.

Depending on the nature and size of the item sets, a frequent pattern (FP) tree algorithm can execute much faster than the Apriori algorithm executes. The frequent pattern tree algorithm places item sets in a tree, recursively building the tree based on the count for each of the items in the item sets. For each item set, the frequent pattern tree algorithm sorts its items, left to right, in descending order. The frequent pattern tree algorithm identifies the leftmost item with the most item sets, removes this item from the item sets, and represents this item as a root node with the count of all its item sets. Then the frequent pattern tree algorithm recursively looks at the second position in the descending order of items, and finds the most represented remaining item, and represents that item as a child node. The frequent pattern tree algorithm repeats this process, representing more items as child nodes until the frequent pattern tree algorithm is done with the descending order of items, thereby creating a tree in which each original item set is a path in the tree. Then the frequent pattern tree algorithm generates all of the possible item sets by proceeding upward from the leaves in the tree. If the item sets include enough repetition of items, the frequent pattern tree algorithm can execute in memory.

BRIEF DESCRIPTION OF THE DRAWINGS

In the following drawings like reference numbers are used to refer to like elements. Although the following figures depict various examples, the one or more implementations are not limited to the examples depicted in the figures.

FIGS. 2A-B illustrate block diagrams of extremely simplified examples of item sets and an array for identifying frequent item sets, in an embodiment;

DETAILED DESCRIPTION

General Overview

Figure 1:
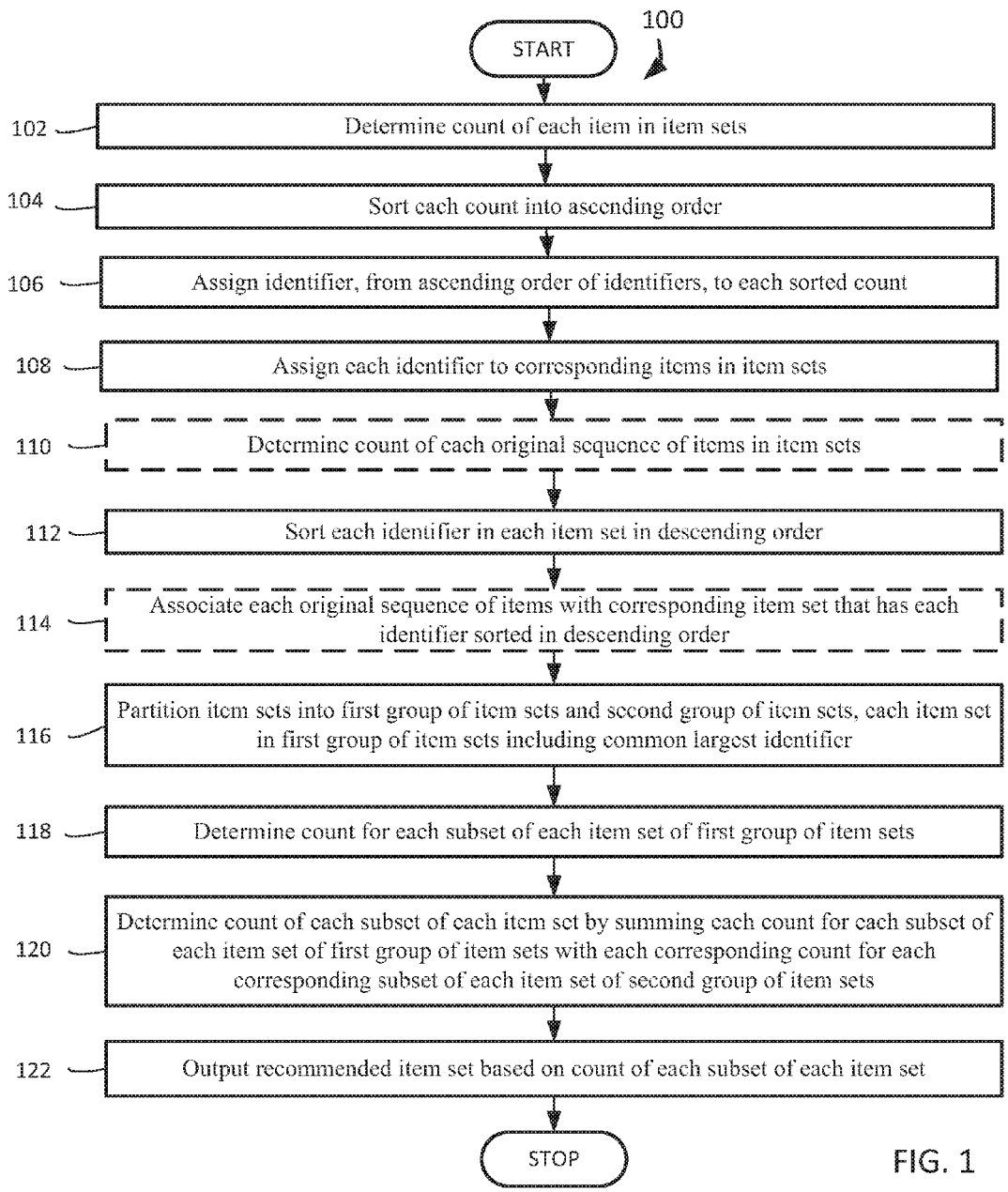
FIG. 1 depicts an operational flow diagram illustrating a high level overview of a method for identifying frequent item sets, in an embodiment.

In accordance with embodiments described herein, there are provided methods and systems for identifying frequent item sets. A system determines a count of each item in multiple item sets, sorts each count into an ascending order, assigns an ascending identifier to each item corresponding to each sorted count, and sorts each identifier in each item set in descending order. The system partitions the item sets into a first group of item sets and a second group of item sets, with each item set in the first group of item sets including a common largest identifier, determines a count for each subset of each item set of the first group of item sets, and determines a count of each subset of each item set by summing each count for each subset of each item set of the first group of item sets with each corresponding count for each corresponding subset of each item set of the second group of item sets. The system outputs a recommended item set based on the count of each subset of each item set.

For example, a database system determines the count of 6 for Contact A, the count of 4 for Contact C, and the count of 5 for Contact B from 7 item sets that include various combinations of Contact A, Contact B, and Contact C. The database sorts the count of 6, the count of 5, and the count of 4 into the ascending order of the count of 4, the count of 5, and the count of 6. The database system assigns identifier 1 to each Contact C, which corresponds to the count of 4, identifier 2 to each Contact B, which corresponds to the count of 5, and identifier 3 to each Contact A, which corresponds to the count of 6, such that the identifier 3 is assigned to Contact A in every item set because the identifier 3 corresponds to the count of 6 for Contact A. The database system sorts each identifier in each set in descending order, such as sorting the set (identifier 1, identifier 2, identifier 3) into the set (identifier 3, identifier 2, identifier 1) in descending order.

The database system partitions the identifiers sets into a first group of sets that includes identifier 3 as the common largest identifier and a second group of sets that has identifier 2 as the common largest identifier. The database system determines a count for each of the first group's subsets of item sets, such as a count of 2 for the subset (identifier 2, identifier 1). Similarly, the database system determines a count for each of the second group's subsets of item sets, such as a count of 1 for the subset (identifier 2, identifier 1).

Next, the database system sums the counts of the subsets for the groups, such as adding the count of 2 for the subset (identifier 2, identifier 1) for the first group to the count of 1 for the subset (identifier 2, identifier 1) for the second group to result in the summed count of 3 for the subset (identifier 2, identifier 1) for both groups. Based on these counts of subsets, the database system outputs a recommended item set (Contact B) to a system user who already purchased Contact A, because most item sets that included Contact A also included Contact B. Further, the database system identifies frequent item sets faster than the Apriori algorithm identifies frequent item sets because the database system starts with item sets and then identifies subsets of the item sets, whereas the Apriori algorithm starts with individual items and then gradually extends these individual items to larger and larger item sets.

Systems and methods are provided for identifying frequent item sets. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, methods and mechanisms for identifying frequent item sets will be described with reference to example embodiments. The following detailed description will first describe a method for identifying frequent item sets, and then describe an extremely simplified example of item sets and an array for identifying frequent item sets.

While one or more implementations and techniques are described with reference to an embodiment in which identifying frequent item sets is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

FIG. 1 depicts an operational flow diagram illustrating a high level overview of a method 100 for identifying frequent item sets. The method 100 may be implemented on either a centralized computing platform or in parallel on a distributed computing platform, such as on Map/Reduce or Spark. As a brief overview, a database system has a set of items with counts, such as Contact A with a count of 6, Contact B with a count of 5, Contact C with a Count of 4, and Contact D with a count of 5. The database system has both the tuple (A,C,B) and the tuple (C,A,D), and needs to sort these tuples to run through the tuples and export tuples and counts. To do that, the database system labels each item, and that labeling has two requirements. The labeling respects the counts of each item, i.e., if count(A)>count(B), then label(A)>label (B). The labeling is total, so for any items J and K, either label(J)>label(K) or label(K)>label(J), even if count(J) =count(K). The second requirement means that the labeling must be a total order. The reason it must be total order is that when the database system is done sorting, all the (A,B,C) tuples must be together and all the (A,D,C) tuples must be together, even if count(D)=count(B). The database system can reverse the ordering between labels, as long as the database system does it everywhere. If the database system doesn't make it a total order (i.e., just uses counts) then the database system can't separate B's and D's.

A system determines a count of each item in multiple item sets, block 102. A count quantifies the total occurrences, or support level, for each corresponding item in the sets. For example and without limitation, this can include the database system determining the count of 6 for Contact A, the count of 5 for Contact B, and the count of 4 for Contact C from the item sets (Contact A, Contact B), (Contact C, Contact A), (Contact C, Contact B, Contact A), (Contact B, Contact C), (Contact B, Contact A), (Contact A, Contact B, Contact C), and (Contact A). Although this example describes the database system counting each item in each of the item sets, the database system may count each item in a limited amount of the item sets. For example, the database system can only count the contacts in item sets that were recorded in the most recent 5 years so that the database system does not make recommendations based on contacts that were recorded more than 5 years ago.

Aspects of the database system are described below in reference to FIG. 3 and FIG. 4. A count can be a measure or a number of an item, such as 6 occurrences of Contact A in a collection of item sets, or the 7 times that a system user submitted a specific type of search query that included the word "james." An item can be anything that the database system can associate with a system user's set, such as a contact, a search term, an account, a lead, an opportunity, a product, a service, or any digital object. A set of items can be any group or collection of entities that are associated with a specific user at a period in time. Examples of item sets include the 9 contacts that an organization member purchased on Monday, the 10 contacts that the organization member purchased on Tuesday, the 8 contacts that the organization member searched for on Tuesday, the 13 accounts that an organization purchased on Wednesday morning, the 12 accounts that the organization purchased on Wednesday afternoon, and the 11 accounts that the organization searched for on Wednesday night.

After determining the count of each item, the system sorts each count into an ascending order, block 104. Sorting the counts of items enables the database system to identify items based on the frequency of the items' occurrences. By way of example and without limitation, this can include the database system sorting the count of 6, the count of 5, and the count of 4 into the ascending order of the count of 4, the count of 5, and the count of 6. Although this example describes the database system sorting counts in an ascending order, the database system can sort counts in a descending order. For example, the database system can sort the count of 4, the count of 5, and the count of 6 into the descending order of the count of 6, the count of 5, and the count of 4. Although not every item may have a unique count, the database system sorts the counts of items into a canonical ordering that provides a unique sorting order. Sorting can be to arrange systematically in a prescribed sequence, such as sorting a smaller number before a larger number. An ascending order can be an increasing sequence, such as the numbers 1, 2, and 3.

Having uniquely sorted the counts, the system assigns an identifier, from identifiers in an ascending order, to each item corresponding to each sorted count, block 106. The unique sorting order enables the database system to assign different identifiers to different items that have the same count, and assigning identifiers to items enables the database system to uniformly sort the items by sorting the identifiers. In embodiments, this can include the database system assigning identifier 1 to each Contact C, which corresponds to the count of 4, identifier 2 to each Contact B, which corresponds to the count of 5, and identifier 3 to each Contact A, which corresponds to the count of 6. Although this example describes the database system assigning increasing identifiers to the sorted counts, the database system can assign decreasing identifiers to the sorted accounts. For example, the database system assigns identifier 3 to each Contact C, which corresponds to the count of 4, identifier 2 to each Contact B, which corresponds to the count of 5, and identifier 1 to each Contact A, which corresponds to the count of 6. Assigning can be allocating or designating an identifier as a reference to a count, such as assigning the identifier 1 to the Contact C, which corresponds to the count of 4. An identifier can be a whole number used to reference a count, such as identifier 1 is the numeral 1 that is assigned to refer to the count of 4, as the identifiers need to be sortable.

Assigning can be allocating or designating an identifier as a reference to an item. For example, the database system temporarily replaces items in the item set (Contact A, Contact B, Contact C) with the identifiers 1, 2, and 3 to result in the set (identifier 3, identifier 2, identifier 1). In another example, the database system creates a temporary set (identifier 3, identifier 2, identifier 1) that is assigned to the item set (Contact A, Contact B, Contact C). In yet another example, the database system modifies the item set (Contact A, Contact B, Contact C) into the item set (Contact A, identifier 3; Contact B, identifier 2; Contact C, identifier 1).

Having assigned identifiers to set's items, the system optionally determines a count of each original sequence of items in multiple item sets, block 108. The count of each original sequence enables the database system to track the original listed order of the items in each item set. By way of example and without limitation, this can include the database system determining a count of 1 for the item set (Contact C, Contact B, Contact A) and determining a separate count of 1 for the item set (Contact A, Contact B, Contact C), and assigning a unique sequence identifier to each of these item sets. For each original sequence of items, the database system records the unique sequence identifier, the count of the original sequence of items, and the set of identifiers for the original sequence of items, with the set of identifiers sorted in descending order, as described below. The database system may record this information for an original sequence of items only if the count for the original sequence of items exceeds a threshold. An original sequence of items can be all of the items in an item set, listed in the order in which all of the items initially appeared in the item set. For example, the item set (Contact C, Contact B, Contact A) and the item set (Contact A, Contact B, Contact C) both contain only the same 3 items. However, since the items are listed in a different order in these two item sets, the database system counts each of these item sets separately as two different original sequences of items.

While the order in which contacts are listed may not appear to be significant, the order of other items in an item set may be significant enough to justify tracking the order of items in the item sets. For example, a user searches for potential contacts by submitting the search queries "san francisco computer sales james jordan" and "san francisco computer sales jordan james." If the database system does not retain the order of the search terms, the database system may interpret these two sets of search terms as the same two searches for the same person who sells computers in San Francisco and who has the names of James and Jordan. If the database system retains the order of the search terms, the database system may interpret these two sets of search terms as searches for two different people who sell computers in San Francisco, one who has the given name of James and the family name of Jordan, and the other who has the given name of Jordan and the family name of James. In some embodiments, the database system retains an original sequence of an item set only if the count of the original sequence of the item set exceeds a threshold count, such that the original sequence of infrequently occurring item sets is not retained.

After assigning identifiers to set's items, and possibly tracking the original sequence of the items, the system sorts each identifier in each item set in descending order, block 110. Sorting identifiers in each set enables the database system to directly compare sets. In embodiments, this can include the database system sorting each identifier in each set in descending order, such as sorting the set (identifier 1, identifier 2, identifier 3) into the set (identifier 3, identifier 2, identifier 1) in descending order. Although this example describes the database system sorting each item set's identifiers in descending order, the database system can sort each item set's identifiers in ascending order. For example, the database system can sort the set (identifier 3, identifier 2, identifier 1) into the set (identifier 1, identifier 2, identifier 3) in ascending order. Descending order can be a decreasing sequence, such as the numbers 3, 2, and 1.

Having sorted each item sets' identifiers in descending order, the system optionally associates each original sequence of items with a corresponding item set that has each identifier sorted in descending order, block 112. The database system maps an item set to its original sequence of items, which will eventually enable the database system to make a recommendation using the original order of the items in an item set when the database system makes a recommendation based on the item set. For example and without limitation, this can include the database system mapping the item set (identifier 3, identifier 2, identifier 1), which corresponds to the sorted descending order of the items in the item set, to the item set (identifier 1, identifier 2, identifier 3), which corresponds to the original order of the items in the item set. Associating can be connecting or linking an item set with its original sequence of items, such as connecting the item set (identifier 3, identifier 2, identifier 1) with the original order item set (identifier 1, identifier 2, identifier 3).

After sorting each item sets' identifiers in descending order, the system partitions the item sets into a first group of item sets and a second group of item sets, with each item set in the first group of item sets including a common largest identifier, block 114. Partitioning the item sets into groups enables the database system to efficiently determine counts of item sets and subsets from a group of similar item sets. By way of example and without limitation, this can include the database system partitioning the identifiers sets into a first group that includes identifier 3 as the common largest identifier: (identifier 3, identifier 2, identifier 1), (identifier 3, identifier 2, identifier 1), (identifier 3, identifier 2), (identifier 3, identifier 2), (identifier 3, identifier 1), and (identifier 3) and a second group that has identifier 2 as the common largest identifier: (identifier 2, identifier 1). Although this example describes the database system partitioning item sets into groups of item sets based on a common largest identifier, the database system may partition item sets into groups of item sets based on a common smallest identifier. Upon partitioning the item sets into the first group of item sets, the database system may sort items in the first group of item sets.

A description of sorting items in a group of item sets is described below in reference to FIGS. 2A-B. Partitioning item sets into groups of item sets can be dividing, distributing, or separating item sets into mutually exclusive parts or portions, such as putting all item sets that have the identifier 3 as their common largest identifier into one collection of item sets, and putting all item sets that have the identifier 2 as their common largest identifier into another collection of item sets. In another example, all item sets that have the identifier 3 as their common smallest identifier are put into one collection of item sets, and all item sets that have the identifier 2 as their common smallest identifier are put into another collection of item sets. A group of item sets can be a collection or aggregation of item sets, such as the first group of item sets that have the identifier 3 as their largest identifier. A common largest identifier included in a group of items sets can be an identifier that has the largest value in each of the group's item sets, such as identifier 3 is the numerically biggest identifier in the first group of item sets.

Having partitioned the item sets into groups of item sets, the system determines a count for each subset of each item set of the first group of item sets, block 116. Determining the counts of subsets of item sets for one group of item sets enables the database system to aggregate all such counts for all such subsets for all such groups. In embodiments, this can include the database system determining the count of 2 for the subset (identifier 3, identifier 2, identifier 1), determining the count of 4 for the subset (identifier 3, identifier 2), determining the count of 3 for the subset (identifier 3, identifier 1), determining the count of 6 for the subset (identifier 3), determining the count of 2 for the subset (identifier 2, identifier 1), determining the count of 4 for the subset (identifier 2), and determining the count of 3 for the subset (identifier 1). Similarly, the database system determines the count of 1 for the subset (identifier 2, identifier 1), the count of 1 for the subset (identifier 2), and the count of 1 for the subset (identifier 1). A subset of items can be any or every part or portion of a collection or set of items, such as the subset (identifier 1) is a subset of the set (identifier 3, identifier 2, identifier 1), and the subset (identifier 3, identifier 2, identifier 1) is a subset of the set (identifier 3, identifier 2, identifier 1). Consequently, the database system can aggregate 3 counts of the subset (identifier 3, identifier 1) from 1 count of the subset (identifier 3, identifier 1) and 2 counts of the subset (identifier 3, identifier 2, identifier 1). A method of determining a count for each subset of each item set in a group of item sets is described below in reference to FIG. 2B.

After determining the count for each subset of each item set of the first group of item sets, the system determines the count of each subset of each item set by summing each count for each subset of each item set of the first group of item sets with each corresponding count for each corresponding subset of each item set of the second group of item sets, block 118. Determining the counts of each subset of each item set enables the database system to make recommendations based on these counts. For example and without limitation, this can include the database system summing the counts of the subsets for the groups, resulting in the count of 2 for the subset (identifier 3, identifier 2, identifier 1), the count of 4 for the subset (identifier 3, identifier 2), the count of 3 for the subset (identifier 3, identifier 1), the count of 6 for the subset (identifier 3), the count of 3 for the subset (identifier 2, identifier 1), the count of 5 for the subset (identifier 2), and the count of 4 for the subset (identifier 1). Summing counts can be adding or aggregating the counts to produce a combined result, such as adding the count of 2 for the subset (identifier 2, identifier 1) from the first group to the count of 1 for the subset (identifier 2, identifier 1) from the second group to result in the count of 3 for the subset (identifier 2, identifier 1) from both groups. The database system identifies frequent item sets faster than the Apriori algorithm identifies frequent item sets because the database system starts with item sets and then identifies subsets of the item sets, whereas the Apriori algorithm starts with individual items and then gradually extends these individual items to larger and larger item sets.

The database system may retain only item sets and/or items with sufficient support, which are item sets and/or items that occur more than a corresponding minimum threshold amount. Once the database system determines the support for each individual item, the database system may delete items that have insufficient support from their corresponding item sets. Additionally or alternatively, once the database system determines the support for each item set, the database system may delete item sets that have insufficient support.

Having determined the count of each subset of each item set, the system outputs a recommended item set based on the count of each subset of each item set, block 120. By way of example and without limitation, this can include the database system outputting a recommended item set (Contact B) to a system user who already purchased Contact A, because 4 of the 6 (66.6%) item sets that included Contact A also included Contact B, thereby exceeding the recommendation threshold of 60%. While some embodiments may also include (Contact C) in the recommended item set, other embodiments do not include (Contact C) in the recommended item set because only 3 of the 6 (50.0%) item sets that included Contact A also included Contact C, thereby failing to meet the recommendation threshold of 60%. In another example, the database system responds to a user's initial search terms set (san francisco computer sales) by outputting a recommended item set (james jordan) because most of the previous search term sets that included the search terms (san francisco computer sales) also included the search terms (james jordan). However, the database system does not list the recommended set as (jordan james) because most of the search term sets that include the search terms (san francisco computer sales james jordan) list a search term order in which "james" is listed before "jordan."

The method 100 may be repeated as desired. Although this disclosure describes the blocks 102-120 executing in a particular order, the blocks 102-120 may be executed in a different order. In other implementations, each of the blocks 102-120 may also be executed in combination with other blocks and/or some blocks may be divided into a different set of blocks. Each of the blocks 102-120 may be implemented on either a centralized computing platform or in parallel on a distributed computing platform.

As an overview example of the process depicted in FIGS. 2A-B, a database system has a long item set 9876543 followed by a short item set 982. In this example, there are counts associated with items 6, 5, and 4, which need to get rolled up into the item 8. FIGS. 2A-B illustrate block diagrams 200 of extremely simplified examples of item sets and an array for identifying frequent item sets, in an embodiment. FIG. 2A includes identifier set 202 (identifier 3, identifier 2), identifier set 204 (identifier 3, identifier 1), identifier set 206 (identifier 3, identifier 2, identifier 1), identifier set 208 (identifier 2, identifier 1), identifier set 210 (identifier 3, identifier 2), identifier set 212 (identifier 3, identifier 2, identifier 1), and identifier set 214 (identifier 3), which are sorted in descending order. The identifier sets 202-214 correspond to the item sets (Contact A, Contact B), (Contact C, Contact A), (Contact C, Contact B, Contact A), (Contact B, Contact C), (Contact B, Contact A), (Contact A, Contact B, Contact C), and (Contact A), respectively.

The system partitions the item sets into the first group of item sets and the second group of item sets, with each group of item sets including a common largest identifier. For example, the database system partitions the item sets 202-206 and 210-214 into a first group of item sets that each have identifier 3 as the common largest identifier, and partitions the set 208 into a second group of item sets that has identifier 2 as the common largest identifier.

Then the system sorts each item set in the first group of item sets based on the identifiers in the item set position adjacent to the item set position for the common largest identifier. For example, since the first position in the item sets 202-206 and 210-214 includes the common largest identifier 3, the database system sorts these sets based on the identifiers included in the second position of these sets, which in these sets includes identifier 2, identifier 1, and null. An item set position can be a place or a location in an item set, such as the first position in the item set storing the common largest identifier. A position in an item set that is adjacent to another position in the item set can be a place or a location in an item set that is next to or adjoining another place or another position in the item set.

An item set can be considered as an array of positions from 0 to N. Given two item sets A and B, A<B (comes after B in the sort) if, in the first array position in which A and B differ, say 4, A[4]<B[4]. So if A is the item set [9,8,7,6,4,3] and B is the item set [9,8,7,6,5,2], A<B because 4<5. Next, the system sorts each item set that include the same identifier in the item set position adjacent to the item set position for the largest identifier based on the identifiers in the item set position adjacent to the item set position that is adjacent to the item set position for the common largest identifier. For example, since the item sets 202, 206, 210, and 212 have identifier 2 in the second position, the database system sorts these sets based on the identifiers in the third position, which in these sets includes identifier 1 and null. Although the sorting of the item sets 202-206 and 210-214 is complete in this extremely simplified example, the database system sorts item sets with more items by continuing to sort based on the next item set position until all of the item set positions have been sorted. The database system sorting the item sets 202-206 and 210-214 results in item sets that are prepared for sequential item set-by-item set comparison, as depicted in FIG. 2B.

The arrays 216-228 depicted in FIG. 2B are actually the same array used by the database system to determine the count for each subset of each item set of the first group of item sets, with the different reference numerals indicating the different states of this array at different points in time. The database system initializes the array 216 to (0, 0, 0), with the number of positions in the array 216 equaling the number of positions in the item set that has the largest number of items. The database system processes the item set 206 by modifying the array 216 (0, 0, 0) to become the array 218 (0, 0, 1). The count of 1 in the third position of the array 218 indicates that the items from the first position of the set 206 to the third position of the set 206 have been collectively identified 1 time so far by the database system.

The system determines whether an item set in a group of item sets matches the next item set in the group of item sets. For example, the database system determines whether the item set 206 (identifier 3, identifier 2, identifier 1) is the same as the item set 212 (identifier 3, identifier 2, identifier 1). One item set matching another item set can be the item sets being the same, equal, or identical, such as the item set 206 (identifier 3, identifier 2, identifier 1) being the same as the item set 212 (identifier 3, identifier 2, identifier 1).

If an item set in a group of item sets matches the next item set in the group of item sets, the system increments a count in a position in the array corresponding to a highest positioned item in the next item set. For example, since the item set 206 (identifier 3, identifier 2, identifier 1) is the same as the item set 212 (identifier 3, identifier 2, identifier 1), the database system modifies the array 218 (0, 0, 1) to become the array 220 (0, 0, 2). A highest positioned item in an item set can be an item that has a location that is associated with the largest numbered location in the item set, such as the third position in an item set that includes only three positions. The count of 2 in the third position of the array 220 indicates that the items from the first position of the set 212 to the third position of the set 212 have been collectively identified 2 times so far by the database system. Due to the sorting of item sets in the group of item sets, all of the item sets which are exactly the same will be sorted to be together, which enables the database system to quickly and efficiently sum the counts of the identical item sets.

Once again, the system determines whether one item set in the first group of item sets matches the next item set in the first group of item sets. For example, the database system determines whether the item set 212 (identifier 3, identifier 2, identifier 1) is the same as the item set 202 (identifier 3, identifier 2). If an item set in a group of item sets does not match the next item set in the group of item sets, the database system processes differing item sets. For example, since the item set 202 lacks identifier 1 that is present in the item set 212, the item set 212 does not match the item set 202, and the database system begins the process for the item sets determined to be not matching.

In the first process for item sets that the system determines to be not matching, the system identifies each subset of an item set that includes an item in the item set that lacks a match to a corresponding item in the next item set, a count for each subset of the item set being based on a count in a position in the array that corresponds to the item. For example, the database system identifies each subset of the item set 212 (identifier 3, identifier 2, identifier 1) that includes identifier 1 because identifier 1 lacks a match to any identifier in the item set 202 (identifier 3, identifier 2).

The database system determines the count of the subsets of item sets that include identifier 1 because the absence of identifier 1 in the set 202 indicates that subsequent sets may not include identifier 1. However, the database system minimizes the determination of counts for subsets of item sets by only counting subsets of item sets that include any identifier(s) that lacks a match in the next item set, which is identifier 1 in this example. The count for the subsets of the item set 212 that include identifier 1 is 2 because the array 220 has the count 2 in its third position, which corresponds to the third position in the item set 212 that has identifier 1. Therefore, the database system determines the count of 2 for the subset (identifier 3, identifier 2, identifier 1), the count of 2 for the subset (identifier 3, identifier 1), the count of 2 for the subset (identifier 2, identifier 1), and the count of 2 for the subset (identifier 1).

The database system may identify subsets of an item set based on the following algorithm. Given n positions of items in an item set, the item in each position can either appear in a subset of the item set or not appear in a subset of the item set. Therefore, the database system can identify subsets based on another array of Booleans, with the value of 1 indicating that an item in that position appears in a subset of the item set, and the value of 0 indicating that an item in that position does not appear in a subset of the item set. Consequently, the database system identifies $2^n-1$ subsets, without identifying the empty subset. This Boolean array also corresponds to a number that is based on the maximum value represented by the array, and each position in the array also corresponds to another number. For example, if the item set 212 (identifier 3, identifier 2, identifier 1) is reversed to become the reversed item set (identifier 1, identifier 2, identifier 3), then the Boolean array for the reversed item set has a maximum value of 7 (1, 1, 1 in binary) and identifier 1 has a value of 1 (1, 0, 0 in binary). Therefore, the database system identifies all subsets of item set 212 that include identifier 1 by identifying the subset corresponding to the array's binary value of 7, decrementing the array's binary value of 7 to the binary value of 6, identifying the subset corresponding to the array's binary value of 6, and continuing decrementing the array's binary values and identifying the subsets corresponding to these values, including the identification of the subset corresponding to the array's binary value of 1.

More generally, given a previous item set of length m and a new item set, the database system calculates the length n of the common prefix. The database system executes the following algorithm.

```
For k = m to n + 1 descending do
   for i = 2^k -1 to 2^(k-1) do
      for the previous item set do
         create an empty item set
         for j = 1 to k do
            if the jth bit of i is 1, add the item in the jth position
            (if tracking ordering, append the ordering ids and counts)
         od
         emit the item set with the count in position k
         (for ordering, also emit the ids and counts for the original orders)
      od
   od
   increment the count in position k-1 by the count in position k
   set the value in position k to 0
   (if tracking ordering, free the list as well)
od
```

Therefore, the database system only identifies subsets for the positions in an item set which changed from the previous item set to the next item set. If the database system identifies some subsets more than once, the database system sums the counts of the corresponding subsets after processing the final item set in the group of item sets.

In the second process for item sets that the system identifies as not matching, the system adds a count from a position in the array, corresponding to a highest positioned item in the first item set, to a position in the array that corresponds to a highest positioned item that matches between the first item set and the second item set. For example, the database system adds the count of 2 in the third position of the array 220, which corresponds to the highest positioned identifier 1 in the set 212, to the second position in the array 220 which corresponds to identifier 2 in the set 202, which is the highest positioned item that matches between the set 212 and the set 202. Adding a count from the third position in the array 220 to the second position in the array 222 results in re-initializing the third position in the array 222 to zero. At this point, the array 222 depicted in FIG. 2 would have the count of 2 in the second position and a count of 0 in the third position if the set 202 had an item in the third position. However, since the set 202 has no item in the third position, the database system nulls the third position in the array 222, and continues processing the array 222.

In the third process for item sets that the system identifies as not matching, the system adds a count in a position in the array that corresponds to a highest positioned item in the second item set. For example, the database system adds a count of 1 to the second position in the array 222, which corresponds to identifier 2 in the set 202, which is the highest positioned item in the set 202. Since the database system had just added a count of 2 to the second position in the array 222, the subsequent addition of the count of 1 to the second position in the array 222 results in the count of 3 in the second position of the array 222, as depicted in FIG. 2. The count of 3 in the second position of the array 222 indicates that the items from the first position of the set 202 to the second position of the set 202 have been collectively identified 3 times so far by the database system.

Continuing the example, the database system determines whether the item set 202 (identifier 3, identifier 2) is the same as the item set 210 (identifier 3, identifier 2). Since the item set 202 (identifier 3, identifier 2) is the same as the item set 210 (identifier 3, identifier 2), the database system modifies the array 222 (0, 3) to become the array 224 (0, 4). The count of 4 in the second position of the array 224 indicates that the items from the first position of the set 210 to the second position of the set 210 have been collectively identified 4 times so far by the database system.

Further to the example, the database system determines whether the item set 210 (identifier 3, identifier 2) is the same as the item set 204 (identifier 3, identifier 1). Since the item set 204 lacks identifier 2 that is present in the item set 210, the item set 210 does not match the item set 204. Therefore, the database system identifies each subset of the item set 210 (identifier 3, identifier 2) that includes identifier 2 because identifier 2 lacks a match to any identifier in the item set 204 (identifier 3, identifier 1). The database system determines the count of the subsets of item sets that include identifier 2 because the absence of identifier 2 in the set 204 indicates that subsequent sets may not include identifier 2. However, the database system minimizes the determination of counts for subsets of item sets by only counting subsets of item sets that include any identifier(s) that lacks a match in the next item set, which is identifier 2 in this example. The count for the subsets of the item set 210 that include identifier 2 is 4 because the array 224 has the count 4 in its second position, which corresponds to the second position in the item set 210 that has identifier 2. Therefore, the database system determines the count of 4 for the subset (identifier 3, identifier 2), and the count of 4 for the subset (identifier 2).

Then the database system adds the count of 4 in the second position of the array 224, which corresponds to the highest positioned identifier 2 in the set 210, to the first position in the array 226 which corresponds to identifier 3 in the set 204, which is the highest positioned item that matches between the set 210 and the set 204. Adding a count from the second position in the array 224 to the first position in the array 226 results in re-setting the second position in the array 226 to zero. At this point, the array 226 depicted in FIG. 2 would have the count of 4 in the first position and a count of 0 in the third position. However, the database system continues processing the array 226 by adding a count of 1 to the second position in the array 226, which corresponds to identifier 1 in the set 204, which is the highest positioned item in the set 204. The count of 1 in the second position of the array 226 indicates that the items from the first position of the set 204 to the second position of the set 204 have been collectively identified 1 time so far by the database system. The count of 4 in the first position of the array 226 indicates that the item in the first position of the set 204 has been collectively identified 4 additional times, or 5 total times, so far by the database system.

Next in the example, the database system determines whether the item set 204 (identifier 3, identifier 1) is the same as the item set 214 (identifier 3). Since the item set 214 lacks identifier 1 that is present in the item set 210, the item set 204 does not match the item set 214. Therefore, the database system identifies each subset of the item set 204 (identifier 3, identifier 1) that includes identifier 1 because identifier 1 lacks a match to any identifier in the item set 214 (identifier 3). The database system determines the count of the subsets of item sets that include identifier 1 because the absence of identifier 1 in the set 214 indicates that subsequent sets may not include identifier 1. However, the database system minimizes the determination of counts for subsets of item sets by only counting subsets of item sets that include any identifier(s) that lacks a match in the next item set, which is identifier 1 in this example. The count for the subsets of the item set 204 that include identifier 1 is 1 because the array 226 has the count 1 in its second position, which corresponds to the second position in the item set 204 that has identifier 1. Therefore, the database system determines the count of 1 for the subset (identifier 3, identifier 1), and the count of 1 for the subset (identifier 1). The database system previously determined the count of 2 for the subset (identifier 3, identifier 1), and the count of 2 for the subset (identifier 1) when the database system determined that the set 202 lacked identifier 1. After the database system subsequently identifies the final item set in the first group of item sets, the database system aggregates counts for corresponding subsets, thereby resulting in the count of 3 for the subset (identifier 3, identifier 1), and the count of 3 for the subset (identifier 1).

Then the database system adds the count of 1 in the second position of the array 224, which corresponds to the highest positioned identifier 1 in the set 204, to the first position in the array 228 which corresponds to identifier 3 in the set 214, which is the highest positioned item that matches between the set 204 and the set 214. Adding a count from the second position in the array 226 to the first position in the array 228 results in re-setting the second position in the array 228 to zero. At this point, the array 228 depicted in FIG. 2 would have the count of 5 in the first position and a count of 0 in the second position if the set 214 had an item in the second position. However, since the set 214 has no item in the second position, the database system nulls the second position in the array 228, and continues processing the array 228 by adding a count of 1 to the first position in the array 228, which corresponds to identifier 3 in the set 214, which is the highest positioned item in the set 214. Since the database system had just added a count of 1 to the count of 4 in the first position in the array 228, the subsequent addition of the count of 1 to the first position in the array 228 results in the count of 6 in the first position of the array 228, as depicted in FIG. 2. The count of 6 in the first position of the array 228 indicates that the item in the first position of the set 214 has been collectively identified 6 times so far by the database system.

Upon identifying an item set as the final item set in the first group of item sets, the database system identifies each subset of the final item set, with the count for a subset of the final item set being based on the count in a position in the array that corresponds to the highest positioned item that is common to the subset. For example, the database system determines the count of 6 for the subset (identifier 3) because of the count of 6 in the first position of the array 228, corresponding to identifier 3 which is the highest positioned item that is common to the subset (identifier 3). Although this extremely simplified example results in the database system identifying only a single subset based on the final item set including only a single item, the database system may identify multiple subsets based on a final item set that includes multiple items. Examples of the database system identifying multiple subsets based on an item set that includes multiple items are described above.

In another example, if the set 204 was the final item set in the first group of item sets, then the database system would have identified each subset of the item set 204 (identifier 3, identifier 1). The count for the subsets of the item set 204 that include identifier 1 is 1 because the array 226 has the count 1 in its second position, which corresponds to the second position in the item set 204 that has identifier 1. Therefore, the database system would determine the count of 1 for the subset (identifier 3, identifier 1), and the count of 1 for the subset (identifier 1). The count for the subsets of the item set 204 that include identifier 3 is 4 because the array 226 has the count 4 in its first position, which corresponds to the first position in the item set 204 that has identifier 3. Therefore, the database system would determine the count of 4 for the subset (identifier 3).

If the database system is tracking the original sequences of items, the database system maintains an array or list of the original sequences of items. When the database system identifies that the previous item set in a group of item sets does not match the next item set in the group of item sets, the database system associates the counts and subsets for these item sets with the list of the original sequences of items. Just as the database system determines the count of each subset of each item set, the database system also determines the count of each original sequence of items that corresponds to each of these subsets. When the database system determines the count of each subset of each item set in each group of item sets, the database system can union the counts of subsets associated with the list of original sequences of items that are associated with each group of item sets, thereby enabling the database system to determine the count for each original sequence of items.

If the entire algorithm is executing on multiple computing platforms at once, many platforms are generating the same item sets that need to be combined. For example, if a first group of item sets has the highest item number 9 and includes the item set 9765, while a second group of item sets has highest the highest item number 8 and includes the item set 8765, the algorithm processing both groups will generate the item subset 765, each with some count and potentially a set of orderings. From the map/reduce perspective this has been the map part. In the reduce part, the algorithm sums the counts by concatenating the lists of original sequences because the lists from the first group are all from original item sets that contain item number 9 and the lists from the second group are all from original item sets that do not include item number 9, but do include item number 8. In terms of item sets, the algorithm is done. But in terms of ordering, the algorithm needs to run through the lists of original sequences and determine the probabilities of the orderings, so that, for example, when suggesting a next word, the algorithm knows what display order to suggest.

At the beginning, the database system recorded the original sequences of items and their counts, assigned each sequence a number, and then associated with each sorted item set an array of the different sequences. Now, when the algorithm has all of the original item sets, the algorithm also has those lists of original sequences. For example, the algorithm was processing the item set 987654 and is now processing the item set 9872. The algorithm has some count for the item set 987654, say n, and the algorithm has a list of pointers to original sequences, such as the sequences a, b, and c. The algorithm needs to merge the information for the item set 987654 with the information for the item subset 987 before considering the item set 9872. So the algorithm takes the count, n, from the $6^{th}$ position (under the 4) and adds it to the count in the third position. But if the item subset 987 has been seen as an item set in the original database, then it also has a list of sequences, such as the sequences d and e. If an item subset is not an original item set, then the list is empty. So the algorithm just needs to put the two lists of original sequences together and the item subset 987 gets the sequences a, b, c, d, and e. At this stage, the algorithm will never process the same original item set twice, so the algorithm can just concatenate the lists of original sequences.

System Overview

Figure 3:
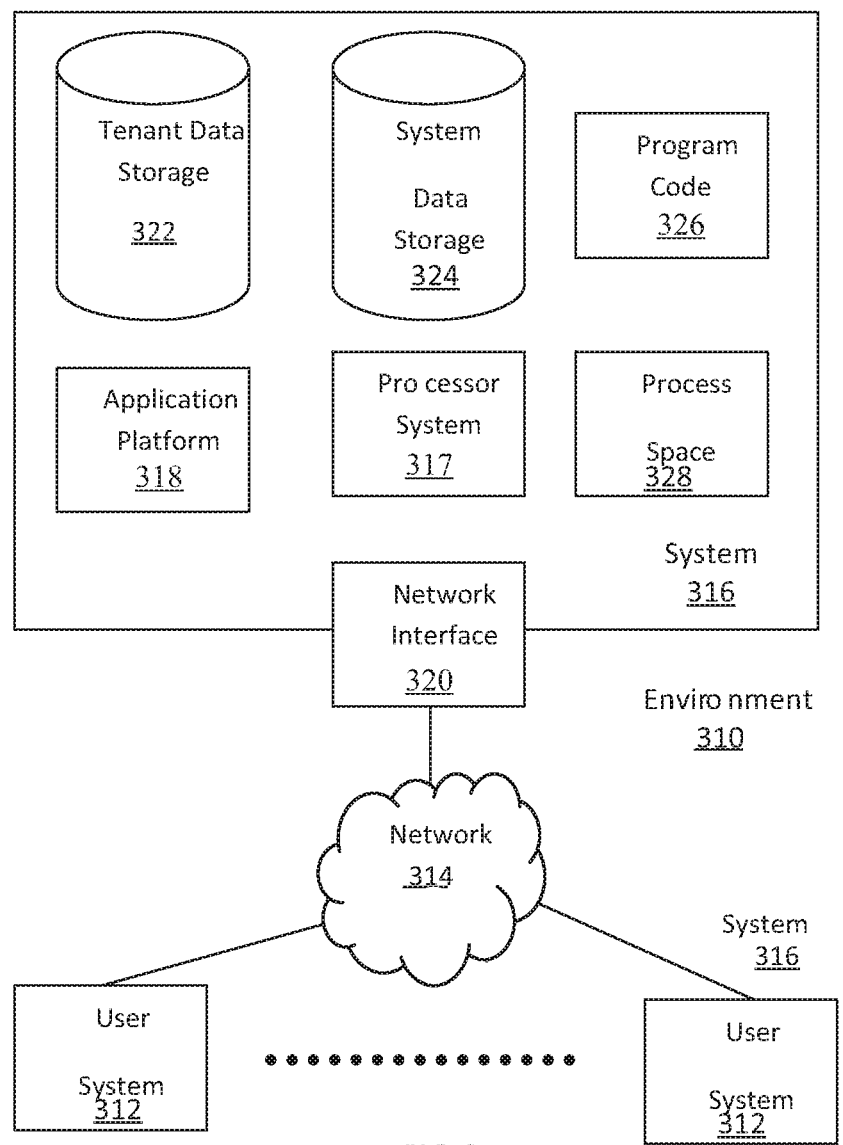
FIG. 3 illustrates a block diagram of an example of an environment wherein an on-demand database service might be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 may be a handheld computing device, a mobile phone, a laptop computer, a work station, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects. A relational database management system (RDMS) or the equivalent may execute storage and retrieval of information against the database object(s). The application platform 318 may be a framework that allows the applications of the system 316 to run, such as the hardware and/or software, e.g., the operating system. In an embodiment, the on-demand database service 316 may include the application platform 318 which enables creation, managing and executing one or more applications developed by the provider of the on-demand database service, users accessing the on-demand database service via user systems 312, or third party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 412 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 316 implements applications other than, or in addition to, a CRM application. For example, the system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages and applications available to it from the system 316 over the network 314. Each of the user systems 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 316 or other systems or servers. For example, the user interface device may be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 312 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 316 is configured to provide webpages, forms, applications, data and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
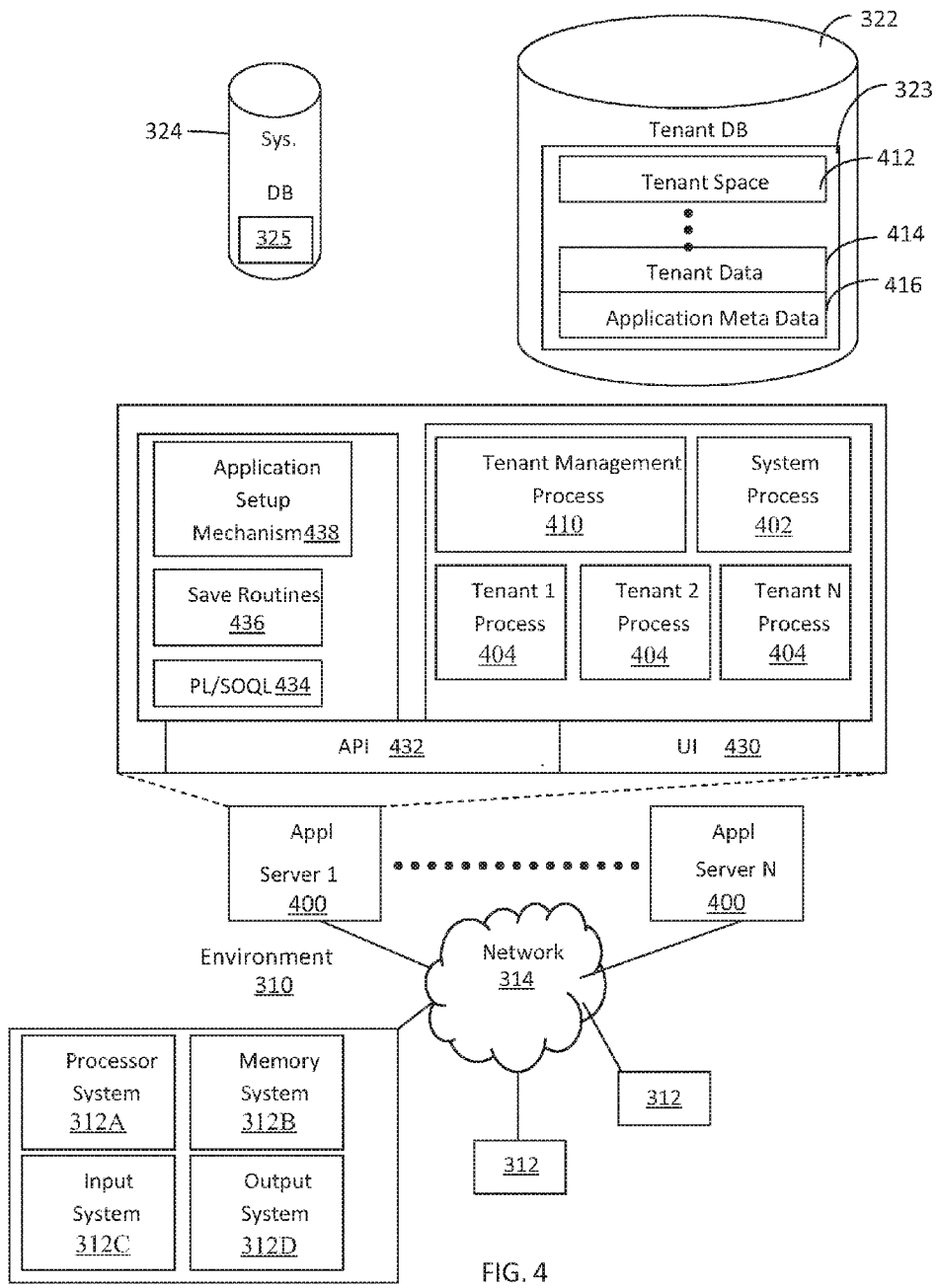
FIG. 4 illustrates a block diagram of an embodiment of elements of FIG. 2 and various possible interconnections between these elements.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D. FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers $400_1$-$400_N$, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in reference to FIG. 3. Regarding the user systems 312, the processor system 312A may be any combination of one or more processors. The memory system 312B may be any combination of one or more memory devices, short term, and/or long term memory. The input system 312C may be any combination of input devices, such as one or more keyboards, mice, trackballs, scanners, cameras, and/or interfaces to networks. The output system 312D may be any combination of output devices, such as one or more monitors, printers, and/or interfaces to networks. As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410. Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which can be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414. Similarly, a copy of MRU items for an entire organization that is a tenant might be stored to the tenant storage area 412. The UI 430 provides a user interface and the API 432 provides an application programmer interface to the system 316 resident processes to users and/or developers at the user systems 312. The tenant data and the system data may be stored in various databases, such as one or more Oracle™ databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 434 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 416 for the subscriber making the invocation and executing the metadata as an application in a virtual machine.

Each application server 400 may be communicably coupled to database systems, e.g., having access to the system data 325 and the tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals and progress data, etc., all applicable to that user's personal sales process (e.g., in the tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for identifying frequent item sets, the apparatus comprising:
   one or more processors; and
   a non-transitory computer readable medium storing a plurality of instructions, which when executed, cause the one or more processors to:
   determine, by a database system, a plurality of counts, each count representing the number of occurrences that each item is included in a plurality of item sets;
   sort, by the database system, each count of the plurality of counts into an ascending order;
   assign, by the database system, a numerical identifier to each item corresponding to each sorted count, the assigned numerical identifiers being in ascending order;
   sort, by the database system, the numerical identifiers in each of the plurality of item sets into a descending order;
   partition, by the database system, the plurality of item sets into a first group of item sets and a second group of item sets, each item set in the first group of item sets including a common largest numerical identifier;
   determine, by the database system, one or more subsets of each item set of the first group, and one or more subsets of each item set of the second group of item sets;
   determine a count of each subset of the first group, and the second group of item sets;
   cause, by database system, each count for each subset of each item set of the first group to be added to each corresponding count for each corresponding subset of each item set of the second group of item sets to determine a count of each subset of each item set of the plurality of item sets; and
   cause, by the database system, a recommended item set based on the count of each subset of each item set of the plurality of item sets to be outputted.

2. The system of claim 1, comprising further instructions, which when executed, cause the one or more processors to:
   determine, by the database system, a count of each original sequence of items in the plurality of item sets; and
   associate, by the database system, each original sequence of items with a corresponding item set that has each numerical identifier sorted in the descending order.

3. The system of claim 1, wherein partitioning the plurality of item sets into the first group of item sets comprises sorting each item set in the first group of item sets based on numerical identifiers in an item set position adjacent to an item set position for the common largest numerical identifier, and sorting each item set that includes a same numerical identifier in the item set position adjacent to the item set position for the largest numerical identifier, based on numerical identifiers in an item set position adjacent to the item set position that is adjacent to the item set position for the common largest numerical identifier.

4. The system of claim 1, wherein determining the count for each subset of each item set of the first group of item sets comprises:

determining, by the database system, whether a first item set in the first group of item sets matches a second item set in the first group of item sets;

incrementing, by the database system, a count in a position in an array corresponding to a highest positioned item in the second item set, the array including array positions that correspond to items in a largest item set in the first group of item sets, in response to a determination that the first item set in the first group of item sets matches the second item set in the first group of item sets; and identifying, by the database system, each subset of the first item set that includes an item in the first item set that lacks a match to a corresponding item in the second item set, a count for each subset of the first item set being based on a count in a position in the array that corresponds to the item, adding a count from a position in the array, corresponding to a highest positioned item in the first item set, to a position in the array that corresponds to a highest positioned item that matches between the first item set and the second item set, and adding a count in a position in the array that corresponds to the highest positioned item in the second item set, in response to a determination that the first item set in the first group of item sets does not match the second item set in the first group of item sets.

5. The system of claim 1, wherein determining the count for each subset of each item set of the first group of item sets comprises identifying, by the database system, each subset of a final item set in the first group of item sets, a count for a subset of the final item set being based on a count in a position in the array that corresponds to a highest positioned item that is common to the subset.

6. The system of claim 1, wherein outputting the recommended item set comprises outputting items in the recommended item set corresponding to numerical identifiers in the recommended item set that are greater than a numerical identifier threshold.

7. The system of claim 1, wherein outputting the recommended item set is further based on an original sequence of items associated with the recommended item set.

8. A computer program product comprising computer-readable program code to be executed by one or more processors when retrieved from a non-transitory computer-readable medium, the program code including instructions to:

determine, by a database system, a plurality of counts, each count representing the number of occurrences that of each item is included in each item set of a plurality of item sets, each item set including at least one item;

sort, by the database system, each count of the plurality of counts into an ascending order;

assign, by the database system, a numerical identifier to each item corresponding to each sorted count, the assigned numerical identifiers being in ascending order;

sort, by the database system, the numerical identifiers in each of the plurality of item sets into a descending order;

partition, by the database system, the plurality of item sets into a first group of item sets and a second group of item sets, each item set in the first group of item sets including a common largest numerical identifier;

determine, by the database system, one or more subsets of each item set of the first group, and one or more subsets of each item set of the second group of item sets;

determine a count of each subset of the first group, and the second group of item sets;

cause, by database system, each count for each subset of each item set of the first group to be added to each corresponding count for each corresponding subset of each item set of the second group of item sets to determine a count of each subset of each item set of the plurality of item sets; and cause, by the database system, a recommended item set based on the count of each subset of each item set of the plurality of item sets to be outputted.

9. The computer program product of claim 8, wherein the program code comprises further instructions to:

determine, by the database system, a count of each original sequence of items in the plurality of item sets; and associate, by the database system, each original sequence of items with a corresponding item set that has each numerical identifier sorted in the descending order.

10. The computer program product of claim 8, wherein partitioning the plurality of item sets into the first group of item sets comprises sorting each item set in the first group of item sets based on numerical identifiers in an item set position adjacent to an item set position for the common largest numerical identifier, and sorting each item set that includes a same numerical identifier in the item set position adjacent to the item set position for the largest numerical identifier, based on numerical identifiers in an item set position adjacent to the item set position that is adjacent to the item set position for the common largest numerical identifier.

11. The computer program product of claim 8, wherein determining the count for each subset of each item set of the first group of item sets comprises:

determining, by the database system, whether a first item set in the first group of item sets matches a second item set in the first group of item sets;

incrementing, by the database system, a count in a position in an array corresponding to a highest positioned item in the second item set, the array including array positions that correspond to items in a largest item set in the first group of item sets, in response to a determination that the first item set in the first group of item sets matches the second item set in the first group of item sets; and identifying, by the database system, each subset of the first item set that includes an item in the first item set that lacks a match to a corresponding item in the second item set, a count for each subset of the first item set being based on a count in a position in the array that corresponds to the item, adding a count from a position in the array, corresponding to a highest positioned item in the first item set, to a position in the array that corresponds to a highest positioned item that matches between the first item set and the second item set, and adding a count in a position in the array that corresponds to the highest positioned item in the second item set, in response to a determination that the first item set in the first group of item sets does not match the second item set in the first group of item sets.

12. The computer program product of claim 8, wherein determining the count for each subset of each item set of the first group of item sets comprises identifying, by the database system, each subset of a final item set in the first group of item sets, a count for a subset of the final item set being based on a count in a position in the array that corresponds to a highest positioned item that is common to the subset.

13. The computer program product of claim 8, wherein outputting the recommended item set comprises outputting items in the recommended item set corresponding to numerical identifiers in the recommended item set that are greater than a numerical identifier threshold.

14. The computer program product of claim 8, wherein outputting the recommended item set is further based on an original sequence of items associated with the recommended item set.

15. A method for identifying frequent item sets, the method comprising:
- determining, by a database system, a plurality of counts, each count representing the number of occurrences that of each item is included in each item set of a plurality of item sets, each item set including at least one item;
- sorting, by the database system, each count of the plurality of counts into an ascending order;
- assigning, by the database system, a numerical identifier to each item corresponding to each sorted count, the assigned numerical identifiers being in ascending order;
- sorting, by the database system, the numerical identifiers in each of the plurality of item sets into a descending order;
- partitioning, by the database system, the plurality of item sets into a first group of item sets and a second group of item sets, each item set in the first group of item sets including a common largest numerical identifier;
- determining, by the database system, one or more subsets of each item set of the first group and one or more subsets of each item set of the second group of item sets;
- determining a count of each subset of the first group and the second group of item sets;
- causing, by database system, each count for each subset of each item set of the first group to be added to each corresponding count for each corresponding subset of each item set of the second group of item sets to determine a count of each subset of each item set of the plurality of item sets; and
- causing, by the database system, a recommended item set based on the count of each subset of each item set of the plurality of item sets to be outputted.

16. The method of claim 15, wherein the method further comprises:
- determining, by the database system, a count of each original sequence of items in the plurality of item sets; and
- associating, by the database system, each original sequence of items with a corresponding item set that has each numerical identifier sorted in the descending order.

17. The method of claim 15, wherein partitioning the plurality of item sets into the first group of item sets comprises sorting each item set in the first group of item sets based on numerical identifiers in an item set position adjacent to an item set position for the common largest numerical identifier, and sorting each item set that includes a same numerical identifier in the item set position adjacent to the item set position for the largest numerical identifier, based on numerical identifiers in an item set position adjacent to the item set position that is adjacent to the item set position for the common largest numerical identifier.

18. The method of claim 15, wherein determining the count for each subset of each item set of the first group of item sets comprises:
- determining, by the database system, whether a first item set in the first group of item sets matches a second item set in the first group of item sets;
- incrementing, by the database system, a count in a position in an array corresponding to a highest positioned item in the second item set, the array including array positions that correspond to items in a largest item set in the first group of item sets, in response to a determination that the first item set in the first group of item sets matches the second item set in the first group of item sets; and
- identifying, by the database system, each subset of the first item set that includes an item in the first item set that lacks a match to a corresponding item in the second item set, a count for each subset of the first item set being based on a count in a position in the array that corresponds to the item, adding a count from a position in the array, corresponding to a highest positioned item in the first item set, to a position in the array that corresponds to a highest positioned item that matches between the first item set and the second item set, and adding a count in a position in the array that corresponds to the highest positioned item in the second item set, in response to a determination that the first item set in the first group of item sets does not match the second item set in the first group of item sets.

19. The method of claim 15, wherein determining the count for each subset of each item set of the first group of item sets comprises identifying, by the database system, each subset of a final item set in the first group of item sets, a count for a subset of the final item set being based on a count in a position in the array that corresponds to a highest positioned item that is common to the subset.

20. The method of claim 15, wherein outputting the recommended item set comprises outputting items in the recommended item set corresponding to numerical identifiers in the recommended item set that are greater than a numerical identifier threshold, and outputting the recommended item set is further based on an original sequence of items associated with the recommended item set.

* * * * *